May 5, 1964 P. J. GEERLINGS 3,131,911
FEED BLENDER

Filed Aug. 3, 1960 5 Sheets-Sheet 1

INVENTOR
P. J. Geerlings
BY
Ayates Dowell
ATTORNEY

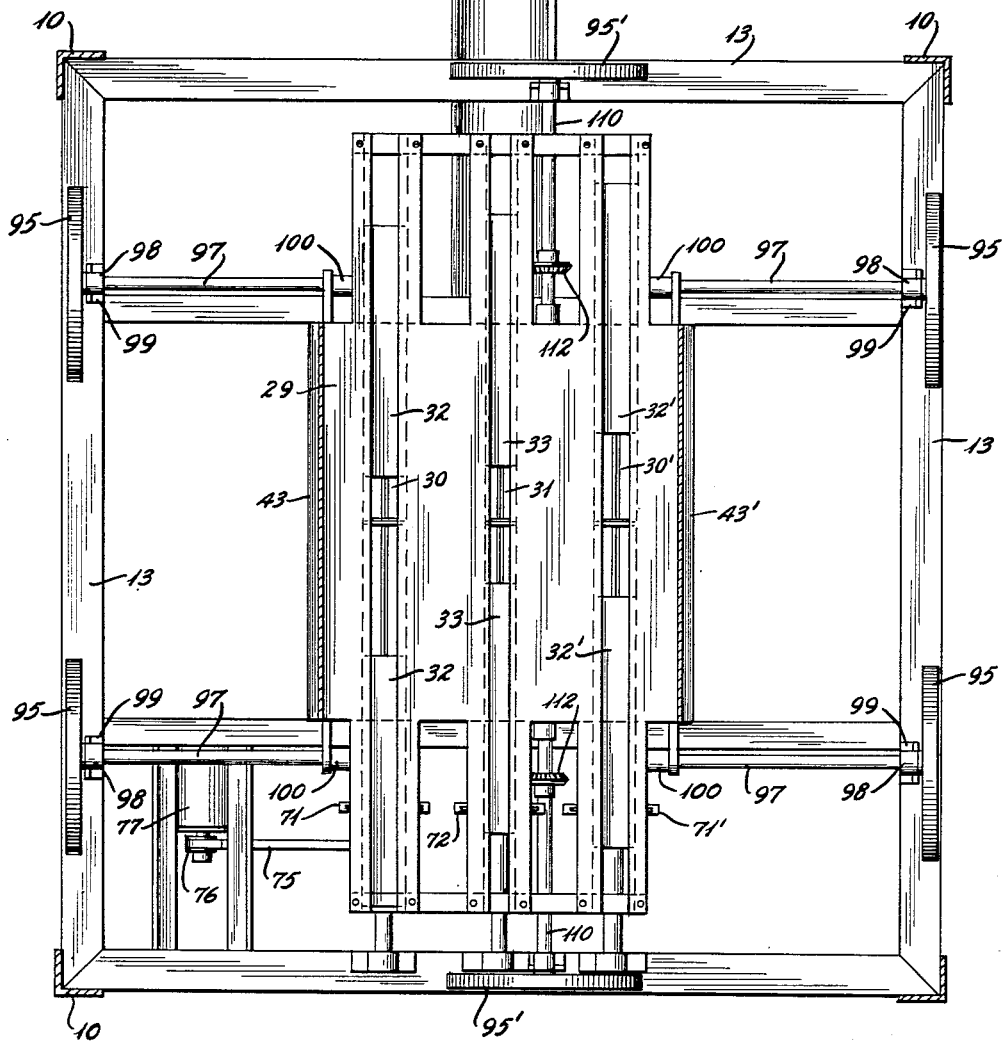

May 5, 1964 P. J. GEERLINGS 3,131,911
FEED BLENDER
Filed Aug. 3, 1960 5 Sheets-Sheet 4
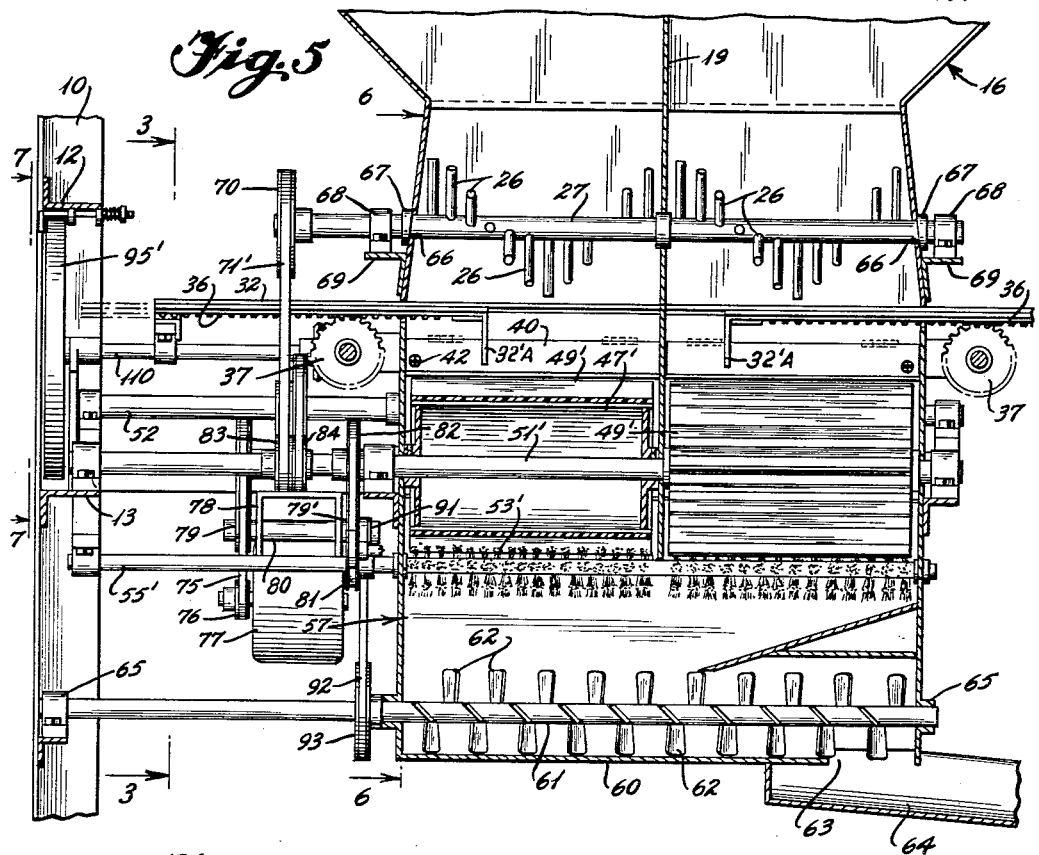
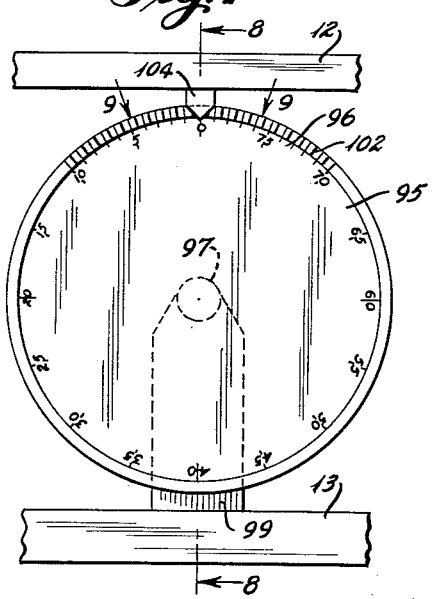
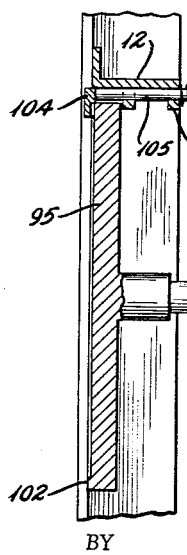
INVENTOR
P. J. Geerlings
BY
ATTORNEY

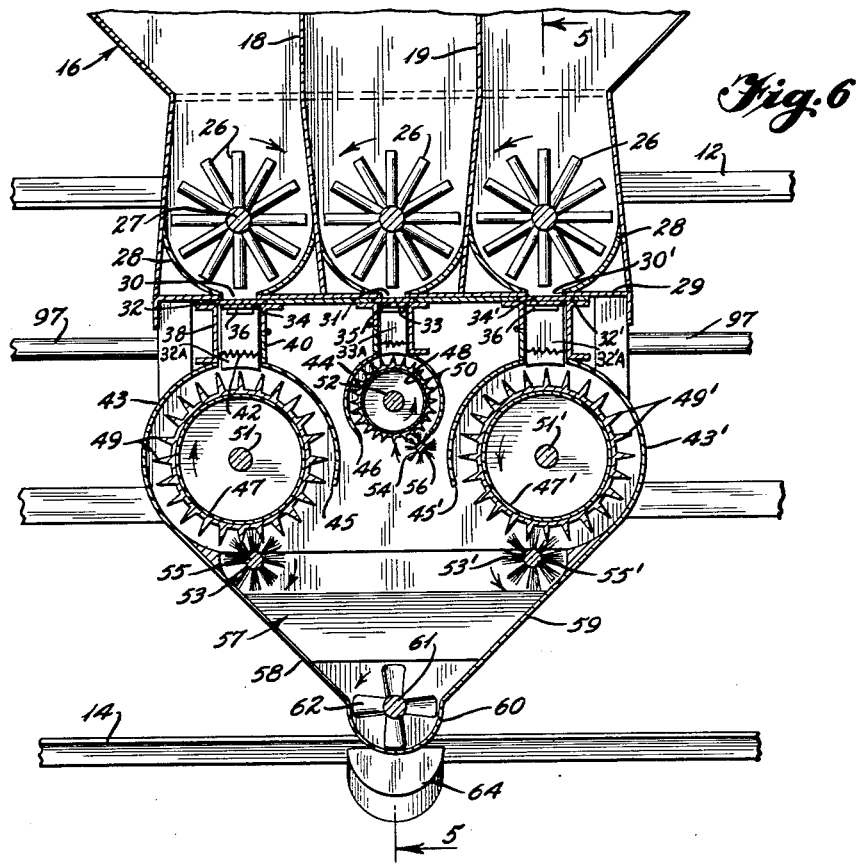

United States Patent Office 3,131,911
Patented May 5, 1964

3,131,911
FEED BLENDER
Petrus J. Geerlings, 2426 W. 4th St., Waterloo, Iowa
Filed Aug. 3, 1960, Ser. No. 47,576
2 Claims. (Cl. 259—21)

This invention relates to mixtures of various substances intended to be used for various purposes, to the manner in which such mixtures are combined in a unitary mass of the desired composition, and to apparatus or equipment by which such substances are integrated or blended to insure uniformity and to render the mass homogeneous.

The invention relates particularly to apparatus or equipment by which ingredient substances can be uniformly blended into a homogeneous mixture of a predetermined character and consistency and in which the proportions of the ingredients can be varied to suit the needs or requirements.

The mixing or blending of substances for various uses and in dry and unaltered or altered condition has been ineffectively and unsatisfactorily accomplished and without the ingredients incorporated proportionately according to the amounts needed to provide a formula of the desired composition which when intended to be used for livestock would be nutritionally correct and with no undesirable variation of consistency, there being no apparatus equipped to calculate individual ingredients and to combine the same into a uniform mixture without substantial variation.

It is an object of the invention to overcome the problems encountered and to provide a mixer or blender capable of combining dry substances of different characteristics into a homogenous mass with the proportions closely controlled to obtain uniformity of the mixture.

Another object of the invention is to provide a mixer or blender having a plurality of containers for substances to be blended, a variable control of the individual substances supplied including visible indicator means by which a uniform quantity of each of the ingredients can be added.

Another object of the invention is to provide mixing or blending apparatus composed of individual supply chambers with controlled discharge, and a mixing chamber in which the discharged substances are thoroughly blended prior to the passage of the mixture from the machine.

Figure 1:
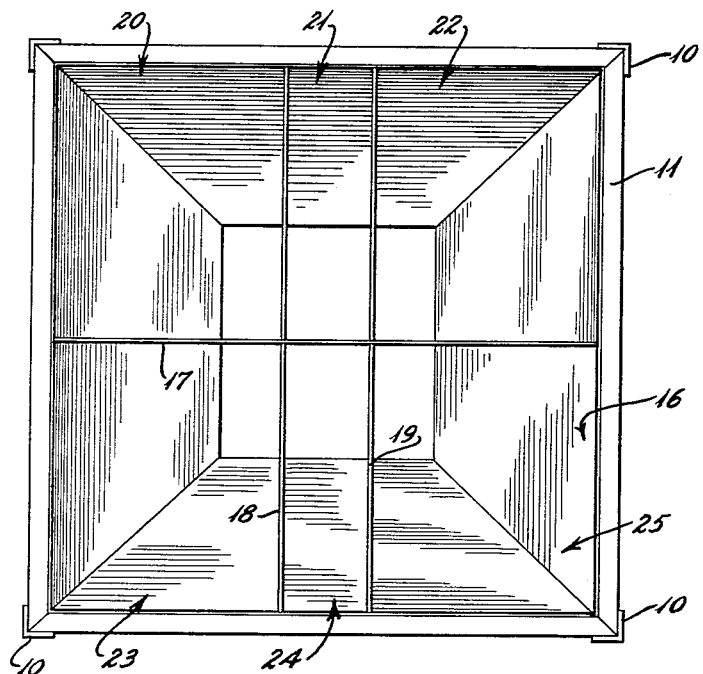
Figure 3:
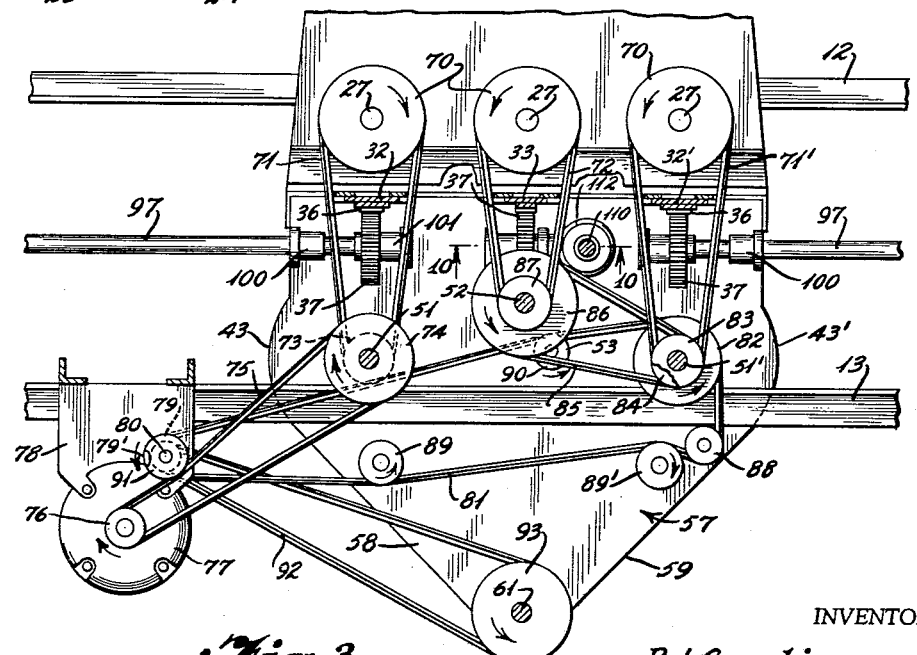
Figure 2:
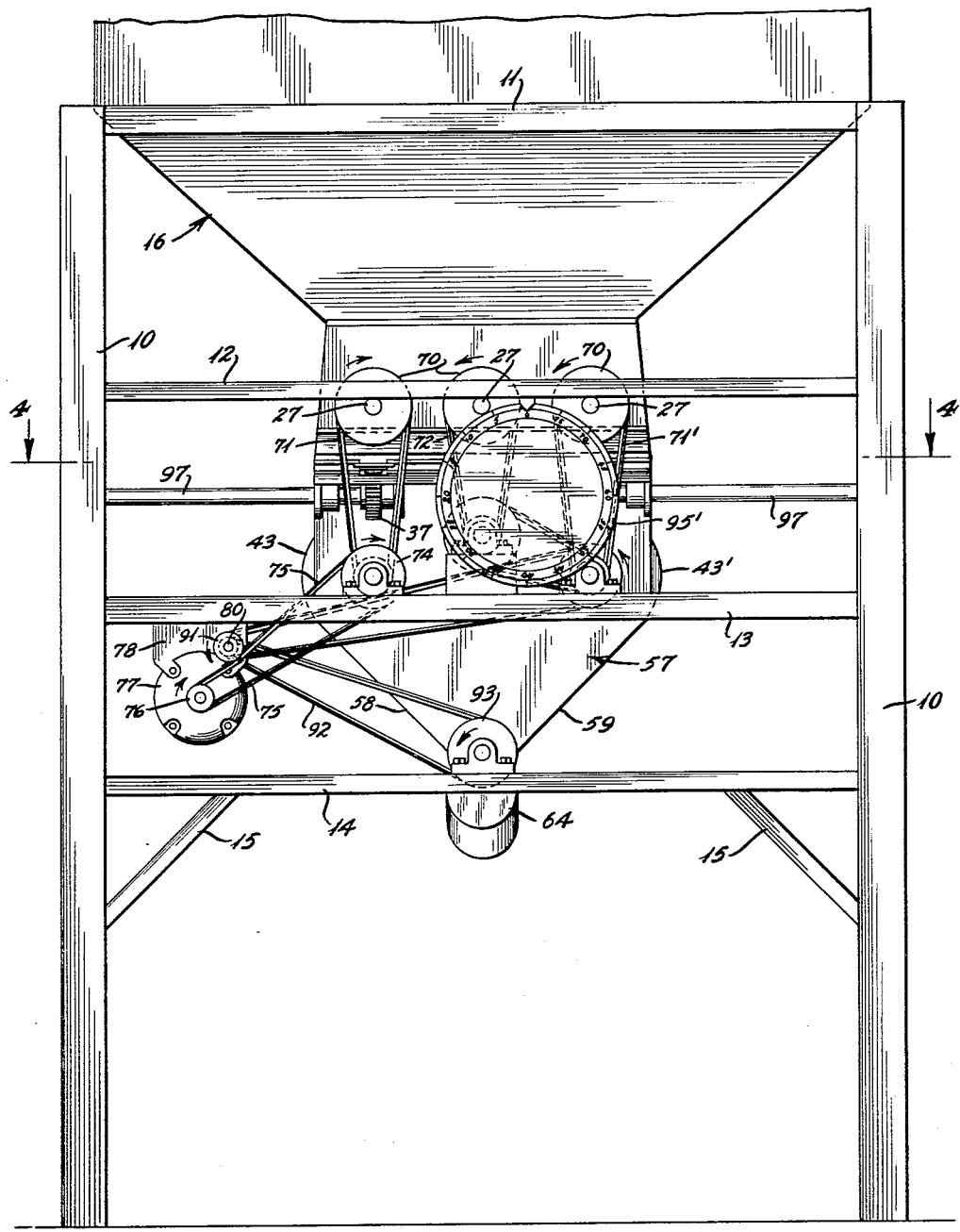

Other objects and advantages of the invention will be apparent from the following description take in conjunction with the accompanying drawings wherein:

FIG. 1 is a top plan view of the hopper constituting a portion of the present invention;

FIG. 2, an enlarged side elevation of the mixer or blender;

FIG. 3, an enlarged section on the line 3—3 of FIG. 5;

FIG. 4, a horizontal section on the line 4—4 of FIG. 2;

FIG. 5, a vertical section on the line 5—5 of FIG. 6;

FIG. 6, a vertical section at right angles to and on the line 6—6 of FIG. 5;

FIG. 7, a front elevation of one of the indicator dials;

FIG. 8, a vertical section on the line 8—8 of the indicator dial of FIG. 7;

FIG. 9, an enlarged fragmentary detail section on the line 9—9 of FIG. 7;

FIG. 10, an enlarged fragmentary horizontal section on the line 10—10 of FIG. 3; and FIG. 11, an enlarged fragmentary view of a feed box.

Briefly stated, the invention is a power driven mixer or blender for the integration, mixing, or blending of relatively dry substances of any desired character regardless of whether in original or altered condition and including a frame on which the several parts are mounted, one or more hoppers each having an agitator and a variable externally controlled discharge outlet with an underlying feed box discharging into a cylindrical feed chamber containing a corrugated roll with each of said chambers having an opening in its bottom through which the material can flow into a mixing chamber, each feed box having a yieldable section for preventing clogging and with rotatable brushes for removing or cleaning any material adhering to the corrugated roll, the longitudinal open top trough along the bottom of the feed chamber receiving the material to be mixed, and with a mixing and transfer member lengthwise therein for mixing and moving the material toward an opening in one end of the trough through which it can fall into a discharge chute and be collected.

With continued reference to the drawings, the invention is a blender for the integration, mixing and blending of substances of various kinds in relatively dry or wet condition and for use in the feeding of livestock and for numerous other purposes.

The invention comprises a frame having a plurality of posts or uprights 10 connected by horizontal or cross members 11, 12, 13 and 14 and with angular reinforcing brackets 15. One or more hopper forming bins or containers is provided for material to be mixed or blended, in the present instance for the purpose of illustration but not of limitation, a hopper 16 being shown tapering from top to bottom and provided with partitions 17, 18 and 19 forming chambers or compartments 20, 21, 22, 23, 24 and 25 for materials to be combined, the central or inner chambers 21 and 24 being smaller than the outer chambers 20, 22, 23 and 25 and consequently being adapted to receive the ingredients to be used in smaller proportions than the others.

In the lower portion of each of the chambers or compartments of the hoppers is provided an agitator 26 having spirally arranged equally spaced radial arms of equal length on a shaft 27 and providing a generally cylindrical body. The bottom 28 of each of the hoppers has a curvature corresponding to that of the agitator 26 to provide close tolerance to the agitator to insure thorough agitation.

A plate 29 is located beneath the bottom walls of the compartments, discharge openings 30 and 30' being provided in such bottom wall and plate 29 beneath the outermost hopper compartments, and an opening 31 being provided beneath the central compartments, the intermediate opening 31 being slightly narrower than the openings 30 and 30' on opposite sides of the same.

Beneath the outer openings 30 and 30' are slides 32 and 32' repectively and beneath the intermediate opening 31 is a slide 33 extending inwardly from each side of the hopper. The slides 32 and 32' have somewhat narrower strengthening and guiding portions 34 and 34' and the slide 33 has a similar slightly narrower portion 35. Beneath the slides 32, 32' and 33 are racks 36 engaged by pinions 37 for moving the racks and the attached slides to control the size of the discharge opening at the bottom of the several compartments. The innermost ends of the slides 32, 32' and 33 have depending flanges 32A, 32'A and 33A respectively which extend downwardly to maintain a strict control of such material by preventing the material in the various comparents of the hopper from escaping or flowing under the slides.

The slides 32 and 32' rest on the upper parallel feed box walls 38 and 39, the latter having a lower segment 40 mounted on a pivot 41 and held in vertical position by a spring 42 so that when jamming tends to occur caused by agglomeration of small particles or the presence of a large particle the lower side portion of the wall 39 can yield to allow passage thereof. The slide 33 is provided with similar structure slightly smaller and beneath the six feed boxes are disposed feed cylinders 43, 43' and 44 with discharge openings 45, 45' and 46.

Within the fed cylinders are corrugated rolls having metal cylinders 47, 47' and 48 with plastic or non-metallic splines or corrugations 49, 49' and 50, the rolls 47, 47' and 48 being mounted on shafts 51, 51' and 52. The outer edges of the splines are located in close proximity to the inner surfaces of the feed cylinders 43, 43' and 44 and to the depending flanges 32A, 32'A and 33A which define the feed boxes or the discharge passages for the materials dispensed. Beneath the corrugated rolls within the openings 45, 45' and 46 are brushes 53, 53' and 54 on shafts 55, 55' and 56, such brushes being provided to remove any material clinging to the corrugated rolls.

Material discharged from the feed rolls through the openings 45, 45' and 46 passes into the mixing chamber 57, the latter having inclined sides 58 and 59 which converge downwardly into a semi-cylindrical trough 60 along the bottom of the chamber and in this semi-cylindrical trough is located a mixing and transfer member having a longitudinal shaft 61 on which a series of blades 62 are spaced along and about such shaft in a manner to cause movement from one end of the shaft toward the other in order that the material may be discharged through an opening 63 into a discharge chute 64. The shaft 61 is mounted in bearings 65 on opposite sides of the hopper.

The driving of the various agitators and associated parts will now be described. The shafts 27 extend through openings 66 in the wall of the hopper 16 and through seals 67, each shaft being supported by bearings 68 mounted on brackets 69. Each shaft 27 has a pulley 70 fixed thereto on one end thereof. The outer shafts 27 are driven by V-belts 71 and 71' and the intermediate shaft 27 is driven by a V-belt 72. The V-belts 71 and 71' drive the agitators in the larger compartments and the intermediate V-belt 72 drives the agitator in the two central smaller compartments.

The V-belt 71 (on the left in FIG. 3) is driven by a pulley 73 mounted on the shaft 51 which is driven by a pulley 74. The pulley 74 is driven by a V-belt 75 from a pulley 76 carried by motor 77 supported by bracket 78 on the horizontal cross member 13. The belt 75 also drives a pulley 79 and a shaft 80 carried by the bracket 78, such shaft driving a pulley 79' serving to drive a belt 81 which in turn drives a pulley 82 mounted on the shaft 51'. A smaller pulley 83 mounted on the shaft 51' drives the V-belt 71' to rotate the pulley 70 and the shaft 27 on the right side of FIG. 3. A second smaller pulley 84 carried by the shaft 51' drives a belt 85 and a pulley 86 on the shaft 52 which also carries and drives a pulley 87, and through it the belt 72 which engages the pulley 70 on the central agitator shaft 27. The belt 81 engages an idler pulley 88 and brush pulleys 89, 89' and 90. On the shaft 80 is a pulley 91 which drives a belt 92 and through it a pulley 93 which drives the shaft 61.

In order to move each of the slides 32 and 32', an operating dial 95 is provided having indicia 96, each dial being mounted on a shaft 97 journaled in bearings 98 carried by brackets 99 mounted on the cross member 13. The inner end of each of the shafts 97 is journaled in bearings 100 and 101 and a pinion 37 is mounted on each shaft intermediate the bearings 100 and 101. Each dial 95 has an annular ring of teeth or serrations 102 around its periphery which engages a projection 103 on a pointer or indicator 104 mounted on a shaft 105 supported in lugs 106 depending from the cross member 12. The indicator 104 is maintained in contact with the serrations 102 by a spring 107 having one end in contact with the inner lug 106 and the opposite end in contact with a washer 108 mounted on the shaft 105 by a pin 109.

Operating dials 95' similar to dials 95 are adapted to operate each of the slides 33 and such dials are mounted on shafts 110, the inner ends of which are journaled in bearings 111 (FIG. 10). A bevel gear 112 is mounted on the shaft 110 intermediate its ends and meshes with a second bevel gear 113 mounted on a shaft 114 carried by a bracket 115 and such shaft 114 supports a pinion 37 to move the racks 36 carried by the slides 33.

In the operation of the device, feeds such as barley, corn, oats, wheat or other grain either whole or ground and other ingredients such as alfalfa meal, flour middlings, tankage, meat scraps, fish meal, linseed meal, soy bean meal, cottonseed meal, or any other type of feedstuffs in meal or granulated form which are used to produce balanced rations for livestock are placed in the individual compartments 20, 21, 22, 23, 24 and 25 and the dial 95 which controls the discharge opening of each compartment is operated to a predetermined setting. When the motor 39 is operated, the material in the several compartments will flow downwardly by gravity past the agitators 26 which maintain the material in a flowable condition and through the discharge openings 30 and 31 into the feed boxes from which they are discharged into the feed cylinders 43 and 44. The material in the feed cylinders is removed by the corrugated rolls 47 and 48 and discharged into the mixing chamber 57. The mixing and transfer member at the bottom of the mixing chamber thoroughly integrates the material thus introduced into the mixing chamber and discharges the same through a discharge chute 64.

If desired the proportions of the formula or feed rations may be varied during the operation of the machine by the simple adjustment of the dials. Since all six of the hoppers operate independently, each can be adjusted to discharge the exact amount desired by setting each dial at the proper position. It has been found that a speed of one r.p.m. on the large corrugated rolls 47 and a speed of one-half r.p.m. on the large corrugated rolls 48 will give a satisfactory result for minimum production. By the increase in the speed a proportionate increase in production can be obtained. The mixing and transfer member preferably is rotated at approximately 60 r.p.m. and the agitators 26 are rotated at a speed of 10 r.p.m.

It will be apparent from the foregoing that in accordance with the spirit and scope of the present invention a blender of numerous products and combinations of products of wet, dry or intermediate moisture content, such products including feed, scratch feed, grain in meal, kernel or pelleted form from which a balanced ration for livestock and poultry readily may be provided has been disclosed. Other uses include blending seeds, fruits, herbs, fertilizers, paints, dyes, tobacco, cement, sand, gravel, material for building blocks, tile, road surfaces and the like.

It will be obvious to those skilled in the art that various changes may be made in the invention without departing from the spirit and scope thereof and that the invention is not limited by that which is described in the specification and shown in the drawings but only as set forth in the accompanying claims.

What is claimed is:

1. A mixer and blender comprising in combination a series of individual hoppers having openings in their lower portions for the egress of feed, agitators in said hoppers, feed boxes operatively associated with said hoppers for receiving feed therefrom and having discharge openings at their lower ends, said feed boxes having side openings normally closed by a segment member, said segment member being openable to permit the passage of oversized material from the hoppers out of the side of said feed box instead of through its discharge opening, feed cylinders operatively connected to said feed boxes for receiving material therefrom, a corrugated roll in each of said feed cylinders, said feed cylinders being mounted in fixed relation to said corrugated roll whereby the flow therethrough is controlled, a mixing chamber operatively associated with said feed cylinders for receiving feed therefrom, dislodging mechanism associated with said corrugated rolls to cause feed to be discharged into said mixing chamber, a trough along the lower portion of said mixing chamber and having a discharge opening adjacent one end, a mixing and transfer member extending lengthwise in said trough, a frame mounting said hoppers and associated parts, power means on said frame operatively connected to drive said agitators, corrugated rolls, feed dislodging means and said mixing and transfer member, and visible indicators for controlling the amount of discharge from said hoppers.

2. A blender comprising the combination of hopper means having a plurality of individual compartments for multiple ingredients, each compartment having a discharge, controls for the variation of the discharge from said hoppers, feed boxes operatively associated with said hoppers for receiving feed therefrom and having discharge openings at their lower ends, said feed boxes having side openings normally closed by a segment member, said segment member being openable to permit the passage of oversized material from the hoppers out of the side of said feed box instead of through its discharge opening, feed cylinders operatively connected to said feed boxes for receiving material therefrom, rotary means in said feed cylinders, said rotary means being mounted in fixed relation to said feed cylinders whereby the flow therethrough is controlled, and a mixing chamber below and operatively associated with said feed cylinders for receiving feed to be mixed.

References Cited in the file of this patent
UNITED STATES PATENTS

| | | |
|---|---|---|
| 1,073,193 | Watts | Sept. 16, 1913 |
| 1,413,345 | Morris | Apr. 18, 1922 |
| 2,017,439 | Grayson | Oct. 15, 1935 |
| 2,080,327 | McKinnis | May 11, 1937 |
| 2,321,082 | Harshberger | June 8, 1943 |
| 2,698,121 | Van Steyn | Dec. 28, 1954 |